(12) United States Patent
Egan et al.

(10) Patent No.: US 6,405,187 B1
(45) Date of Patent: Jun. 11, 2002

(54) UTILIZING ENCODED VECTOR INDEXES FOR STATISTICS IN DATABASE PROCESSING

(75) Inventors: Randy Lynn Egan; Kevin James Kathmann, both of Rochester; Gary Ross Ricard, Chatfield, all of MN (US); Thuan Bui, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,530

(22) Filed: Sep. 10, 1999

Related U.S. Application Data (63) Continuation-in-part of application No. 09/361,868, filed on Jul. 27, 1999, and a continuation-in-part of application No. 09/336,488, filed on Jun. 18, 1999.

(51) Int. Cl.$^7$ .............................................. G06F 17/30
(52) U.S. Cl. ............................... 707/2; 707/3; 707/100
(58) Field of Search ...................... 707/1–10, 100–102

(56) References Cited

U.S. PATENT DOCUMENTS

| | | | | |
|---|---|---|---|---|
| 5,706,495 A | | 1/1998 | Chadha et al. ............... 395/602 |
| 5,819,256 A | * | 10/1998 | Ozbutun et al. ................ 707/2 |
| 6,285,994 B1 | * | 5/1999 | Bui et al. ....................... 707/2 |
| 5,918,225 A | * | 6/1999 | White et al. ................... 707/3 |
| 5,974,408 A | * | 10/1999 | Cohen et al. ................... 707/2 |
| 6,070,164 A | * | 5/2000 | Vagnozzi ..................... 707/100 |

* cited by examiner

Primary Examiner—Hosain T. Alam
Assistant Examiner—Anh Ly
(74) Attorney, Agent, or Firm—Wood, Heron & Evans (57) ABSTRACT

An apparatus and method to significantly improve performance of SQL function processing through the use of an encoded vector index (EVI). An EVI provides the data necessary to count the number of records in a database that match criteria provided by a SQL function. The resulting count can then be used to determine, from among two or more candidate approaches, an approach to use in processing an SQL function. By processing the EVI symbol table in lieu of more traditional database indexes, and/or in lieu of the database table itself, statistics for SQL functions are generated significantly faster.

15 Claims, 7 Drawing Sheets

| EVI SYMBOL TABLE ||||
|---|---|---|---|
| LEADING KEY VALUE | SECONDARY KEY VALUE | CODE | KEY COUNT |
| MN | ABC | 0 | 3 |
| MN | HKA | 1 | 4 |
| MN | HNU | 2 | 3 |
| ND | ABC | 3 | 2 |
| ND | HNU | 4 | 6 |
| WY | ABC | 5 | 4 |
| WY | HKA | 6 | 5 |
| MN | SSP | 7 | 2 |

Sorted Range: rows 1–7
Overflow Range: row 8

| EVI SYMBOL TABLE ||| 
| KEY VALUE | CODE | KEY COUNT |
| --- | --- | --- |
| MN | 0 | 7 |
| ND | 1 | 7 |
| WY | 2 | 6 |

| RELATIVE RECORD # (for reference) | DATABASE FIELD (for reference) | EVI VECTOR CODE |
| --- | --- | --- |
| 1 | MN | 0 |
| 2 | ND | 1 |
| 3 | MN | 0 |
| 4 | WY | 2 |
| 5 | MN | 0 |
| 6 | WY | 2 |
| 7 | ND | 1 |
| 8 | WY | 2 |
| 9 | MN | 0 |
| 10 | WY | 2 |
| 11 | ND | 1 |
| 12 | MN | 0 |
| 13 | ND | 1 |
| 14 | WY | 2 |
| 15 | ND | 1 |
| 16 | ND | 1 |
| 17 | MN | 0 |
| 18 | ND | 1 |
| 19 | WY | 2 |
| 20 | MN | 0 |

| ROW # (for reference) | DATABASE FILE | | |
|---|---|---|---|
| | LOCATION | DEPARTMENT | BUILDING |
| 1 | MN | HNU | 15 |
| 2 | ND | HNU | 3 |
| 3 | MN | HKA | 22 |
| 4 | WY | HKA | 2 |
| 5 | MN | ABC | 8 |
| 6 | WY | ABC | 2 |
| 7 | ND | HNU | 1 |
| 8 | WY | ABC | 1 |
| 9 | MN | HKA | 15 |
| 10 | WY | HKA | 2 |
| 11 | ND | ABC | 1 |
| 12 | MN | HNU | 15 |
| 13 | ND | ABC | 1 |
| 14 | WY | HKA | 2 |
| 15 | ND | HNU | 3 |
| 16 | ND | HNU | 1 |
| 17 | MN | ABC | 8 |
| 18 | ND | HNU | 1 |
| 19 | WY | ABC | 1 |
| 20 | MN | HKA | 22 |
| 21 | MN | SSP | 10 |
| 22 | MN | ABC | 2 |
| 23 | WY | ABC | 2 |
| 24 | WY | HKA | 2 |
| 25 | MN | HNU | 15 |
| 26 | WY | HKA | 1 |
| 27 | ND | HNU | 2 |
| 28 | MN | SSP | 10 |
| 29 | MN | HKA | 22 |

FIG. 4

EVI SYMBOL TABLE 500

| LEADING KEY VALUE | SECONDARY KEY VALUE | CODE | KEY COUNT |
|---|---|---|---|
| MN | ABC | 0 | 3 |
| MN | HKA | 1 | 4 |
| MN | HNU | 2 | 3 |
| ND | ABC | 3 | 2 |
| ND | HNU | 4 | 6 |
| WY | ABC | 5 | 4 |
| WY | HKA | 6 | 5 |
| MN | SSP | 7 | 2 |

Rows 0–6: Sorted Range
Row 7: Overflow Range

EVI SYMBOL TABLE

| LEADING KEY VALUE | SECONDARY KEY VALUE | SECONDARY KEY VALUE | CODE | KEY COUNT |
|---|---|---|---|---|
| MN | ABC | 2 | 0 | 1 |
| MN | ABC | 8 | 1 | 2 |
| MN | HKA | 15 | 2 | 1 |
| MN | HKA | 22 | 3 | 3 |
| MN | HNU | 15 | 4 | 3 |
| MN | SSP | 10 | 5 | 2 |
| ND | ABC | 1 | 6 | 2 |
| ND | HNU | 1 | 7 | 3 |
| ND | HNU | 2 | 8 | 1 |
| WY | ABC | 1 | 9 | 2 |
| WY | ABC | 2 | 10 | 2 |
| WY | HKA | 1 | 11 | 1 |
| WY | HKA | 2 | 12 | 4 |
| ND | HNU | 3 | 13 | 2 |

UTILIZING ENCODED VECTOR INDEXES FOR STATISTICS IN DATABASE PROCESSING

RELATED APPLICATIONS

This application is a continuation-in-part of an earlier patent application by Egan, et al entitled "UTILIZE ENCODED VECTOR INDEXES FOR DISTINCT PROCESSING", Ser. No. 09/361,868 filed Jul. 27, 1999, and a continuation-in-part of an earlier patent application by Egan et al. entitled "UTILIZE ENCODED VECTOR INDEXING FOR DATABASE GROUPING", Ser. No. 09/336,488 filed Jun. 18, 1999, both of which are incorporated herein by reference.

BACKGROUND OF THE INVENTION

1. Technical Field

This invention generally relates to a database management system performed by computers, and more specifically relates to the optimization of structured query language (SQL) queries using an encoded vector index (EVI) to generate statistics.

2. Background Art

An index in a book facilitates locating information on a specific topic quickly and without blindly paging through the book. Database indexes provide similar benefits by providing a method to quickly locate data of interest. Without an index, a database performs a full table scan, blindly searching through every row in a database table until the target data is located. Thus, depending upon where data resides in a database table, such a scan can be a lengthy and inefficient process.

Indexed scans of database tables are more efficient than full table scans since the length of database index entries are in most cases shorter than the database table entries. Shorter entries mean that more index entries can be stored in a single computer page. Indexed scans can therefore result in a considerable reduction in the total number of computer pages that must be processed in order to locate the requested data.

While indexed scans of database tables can improve performance, the complexity of the data being scanned and of the nature of the database query still determine how effectively a query can be implemented. Different queries place differing levels of processing demands on the database in unique ways. As a result, different index types are needed to cope with a user's ever-changing workloads. One type of index is the encoded vector index (EVI), disclosed U.S. Pat. No. 5,706,495, Chadha et al., Jan. 6, 1998, Encoded-Vector Indices For Decision Support and Warehousing (hereinafter "Chadha"), which is incorporated by reference.

An encoded vector index (EVI) is a variation of the bitmap index concept. A bitmap index indicates whether a specific value exists for each row in a particular column. One bit represents each row. Thus, in the bitmap index for the value "MN" in the column "LOCATION," the nth bit equals 1 if the nth row of the data table contains "LOCATION"="MN," or 0 if that row holds a value other than "MN." An EVI serves a similar purpose, but only one index is necessary to account for all the values occurring in the column (whether they be "NY," "MN," or any other). So in an EVI on the "LOCATION" column, the nth position of the EVI contains a bit code that identifies the value of "LOCATION" in the nth row of the table. Thus, whereas a separate bitmap index is required to map each particular key value in a database field, only one EVI is required to represent the same information. Thus, an EVI saves computer memory by including all possible key values for a given field in one database index.

Chadha discloses a method to efficiently scan relational database information by performing bit-vector operations on EVI's, instead of performing analogous operations on the relational database table itself. However, the usage of and dependence on relational database tables has increased dramatically during the past decade, and continues to increase. Thus, new ways to use database tools, such as EVI's, are needed in order to continue to provide significant improvements in query performance; otherwise, database users will be hampered in their ability to maximize intelligent information retrieval.

DISCLOSURE OF INVENTION

According to the present invention, an apparatus and method to significantly improve performance of SQL function processing through the use of an encoded vector index (EVI) is disclosed. An EVI provides the data necessary to generate statistics that can be used in determining a best approach for performing SQL functions. Specifically, by sequentially scanning through the EVI symbol table, one can readily count the number of values in one or more database fields that match a specific criterion. The resulting count can then be used to determine, from among two or more candidate approaches, an approach to use in processing an SQL command. By processing the EVI symbol table in lieu of more traditional database indexes, and/or in lieu of the database table itself, statistics for SQL functions are generated significantly faster.

In a specific disclosed embodiment, the performance of a SELECT SQL command that identifies first and second criteria for record selection applicable to first and second database fields, is enhanced by applying the criterion for each database field to each symbol in the EVI symbol table for that database field, to arrive at a count of the number of records having values in each field that match the criterion for that field. Then, based on the results of the count, the SELECT SQL command is performed by either (a.) selecting a set of records in which the first field does or does not match the first criterion, and then selecting from or adding to this set of records, records in which the second field does or does not match the second criterion, or (b.) selecting a set of records in which the second field does or does not match the second criterion, and then selecting from or adding to this set of records, records in which the first field does or does not match the first criterion. The approach taken may be chosen based on the relative count of records matching the first criterion compared to the count of records matching the second criterion, the logical operators applied to the criteria and the logical relationship between the criteria in the SELECT SQL command.

The foregoing and other features and advantages of the invention will be apparent from the following more particular description of embodiments of the invention, as illustrated in the accompanying drawings.

BRIEF DESCRIPTION OF DRAWINGS

The embodiments of the present invention will hereinafter be described in conjunction with the appended drawings, where like designations denote like elements, and.

MODE(S) FOR CARRYING OUT THE INVENTION

Figure 1:
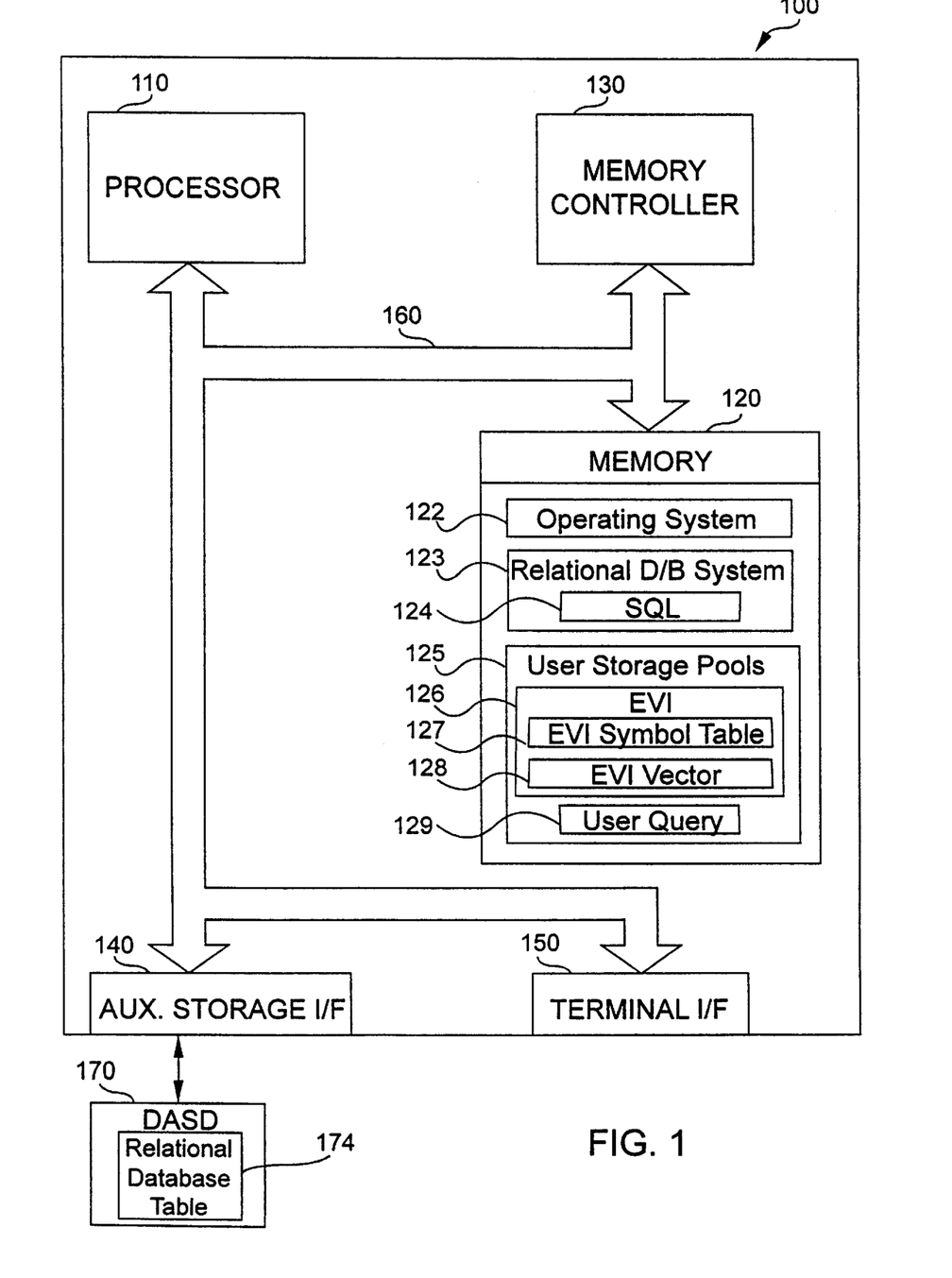
FIG. 1 is a block diagram of an apparatus according to an embodiment of the present invention.

The methods of the present invention employ computer-implemented routines to query information from a database. Referring now to FIG. 1, a block diagram of a computer system which can implement an embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table 174 from auxiliary storage devices, such as magnetic disk (e.g., hard disks or floppy diskettes) or optical storage devices (e.g., CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include an encoded vector index (EVI) 126, and a user query 129. EVI 126 includes an EVI symbol table 127 and an EVI vector 128. EVI 126 is a database index for a relational database table, such as relational database table 174, that is stored in DASD 170. User query 129 is a request for information from relational database table 174 stored in DASD 170. The methods of the present invention do not require that the relational database table be loaded into memory 120 to obtain the information requested in user query 129. Instead, EVI 126 is loaded into memory 120 and provides relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular encoded vector index (EVI) 126 exists that might scan more efficiently than another database index or than the relational database housed in DASD 170. In order for an EVI to be useful to the methods of the present invention, the EVI must be built over the database fields specified by the criteria in user query 129. That is, there must be an EVI index for those particular fields in that particular database. Fields that are indexed are called EVI fields in the EVI. If an EVI with the appropriate EVI fields exists, relational database system 123 will opt to perform an indexed scan of that EVI, instead of a scan of some other traditional database index, or a scan of relational database table 174 itself.

Indexed scans of database tables are more efficient than full table scans since the index key value entries are usually shorter than the length of the database record entry. Shorter entries mean that more index entries can be stored in a single page of memory. Indexed scans can therefore result in a considerable reduction in the total number of computer pages that must be processed in order to locate the requested data.

EVI 126 is one type of database index, used to make certain types of statistical and selection queries more efficient. EVI 126 is also known as a specialized type of bitmap index. A bitmap index indicates which database rows contain a specific key value in a specific database field. The bitmap index is an array of bits, one for each row in the database table. The bit corresponding to each row is turned on or off, depending upon whether the database field contains the specific key value or not. For instance, a bitmap index may be created to indicate which rows in a database table contain a "MN" value in the "location" field. Each bit in the bitmap index that corresponds to a database row containing a location value of "MN" will be turned on, and each bit in the index that corresponds to a database row that does not contain a location value of "MN" will be turned off. In this way, any query about the location of "MN" can be processed very efficiently.

An EVI, such as EVI 126, is structured differently than a traditional bitmap. An EVI is not limited to mapping one specific key value in a database field; instead, an EVI maps all possible key values for a given database field. The field of relational database 174 mapped by EVI 126 is called an EVI field. Sometimes, an EVI can be built over more than one database field. In this case the EVI fields include a leading EVI field, and one or more secondary EVI fields. Then, the information stored in EVI 126 is hierarchically indexed first by the leading EVI field, and further by one or more secondary key fields.

Figure 2:
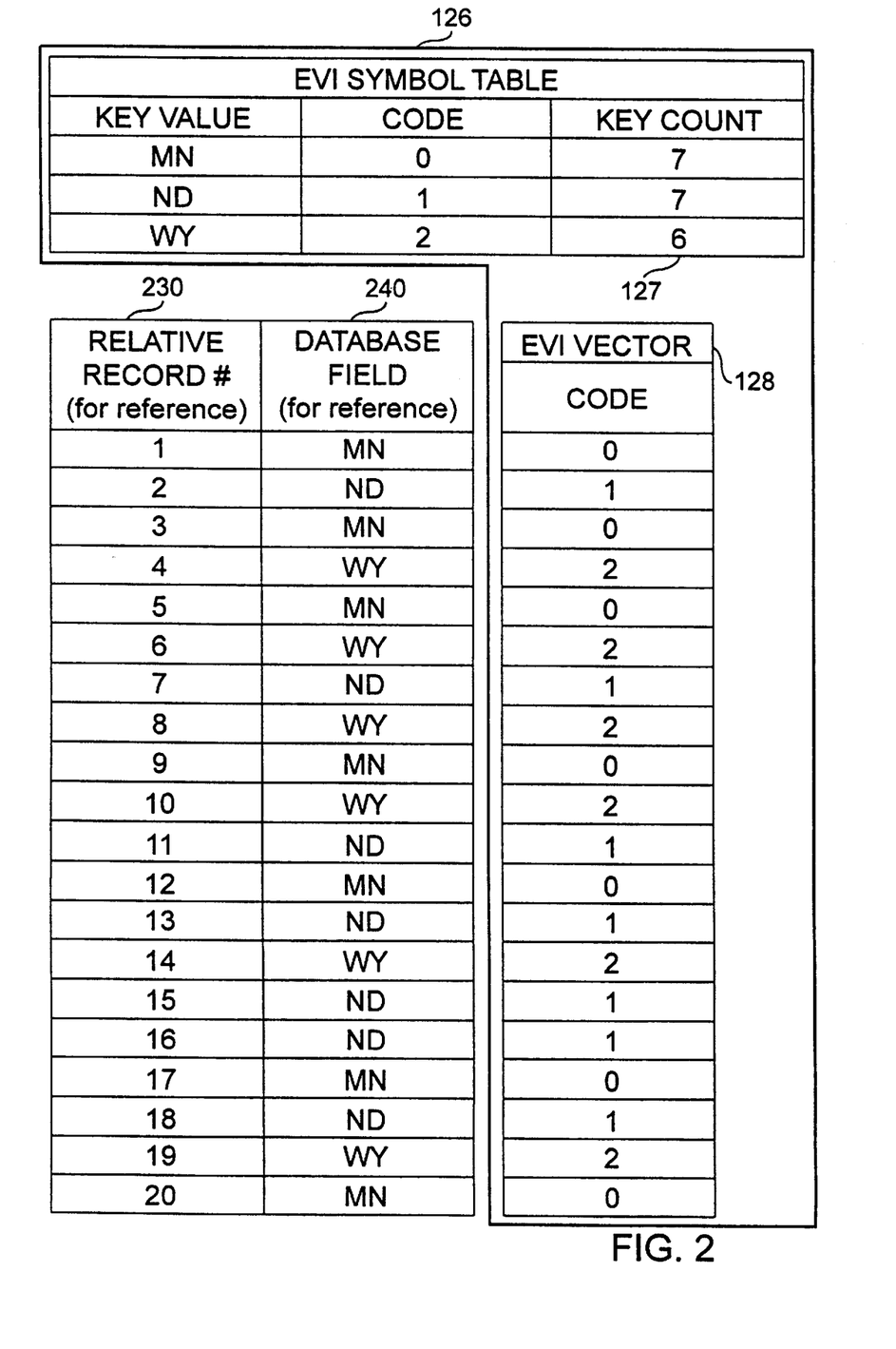
FIG. 2 is a diagram explaining the components of an encoded vector index.

Referring now to FIG. 2, a diagram explaining the components of an encoded vector index is illustrated. In this example, EVI 126 indicates which key value exists in database field 240 for each relative database record number 230. EVI 126 is made up of two tables: EVI symbol table 127, and EVI vector 128. Only the data in EVI symbol table 127 is necessary to the methods of the present invention. The other two tables illustrated in FIG. 2, relative record number 230 and database field 240, are not components of EVI 126; instead these tables are part of the relational database table and are presented as reference information to facilitate an understanding of the structure of EVI 126.

EVI symbol table 127 has an entry for each particular key value that can be found in the database field (in this case, the LOCATION field) of the particular database or database subset for which EVI 126 is an index. FIG. 2 illustrates an EVI for a subset of the database, namely, the LOCATION field (see column 240). Since only three different values appear in the LOCATION field of the database, EVI symbol table 127 contains three rows, one for each particular key value: "MN," "ND," and "WY." EVI symbol table 127 also provides a code for each of these key values, and further provides a count for each of these key values, indicating how many records in the database table contain the key value. Using the code field, EVI symbol table 127 can be used to decode EVI vector 128. However, the code field is not used by the methods of the present invention.

Although the information stored in EVI vector 128 is not necessary for the methods of the present invention, a discussion of its contents provides a better understanding of the overall makeup of EVI 126. EVI vector 128 contains a row for every record in the database for which EVI 126 is an index. Each vector row corresponds to a database record, and contains a code for the key value contained in the EVI field. EVI vector 128 contains 20 rows, because there are 20 records in the database for which EVI 126 is an index. Each code stored in EVI vector 128 translates into the value that exists in the EVI field in the corresponding database record. The translation of the code is made possible by EVI symbol table 127. For example, for relative record number 1 in relative record number field 230, database field 240 has a "MN," which corresponds to a 0 code in EVI vector 128. By looking at EVI symbol table 127, it can be seen that code 0 equates to a key value in the EVI field of "MN."

It should be noted that EVI's are preferably built to reflect the counts of the particular key values in one or more particular database fields, as those values exist in a database at the time that the EVI is built. Those skilled in the art of databases know that in many cases, databases are frequently updated. In order for an EVI to stay current and accurately reflect a database, the EVI must be updated whenever the value of the one or more field(s) over which the EVI is built changes. The same applies when new records are added to the database and when new records are deleted.

Changes to the relational database table can affect an EVI symbol table in two ways. First, a change to the database may require a change in key count for one or more key values. An example of this first type of change is deleting a database record, or changing a database field from one key value to a second key value that also exists in the EVI symbol table. In this first type of change, the EVI symbol table is updated by updating the key count(s) to reflect the changes made to the database fields itself, without requiring a new EVI symbol table entry.

The second type of change to a database requires a new EVI symbol table entry. An example of this type of change is when a new key value is assigned to a database field, that is, a key value that does not exist in that particular database field in any other record in the database. A new key value might replace an old key value, as part of a change to an existing database record. Alternatively, a new key value might be assigned to database field when adding a new database record. Either way, the new key value will not exist in an existing EVI symbol table.

When the existing EVI was built, the EVI symbol table's EVI fields were sorted by key value. Now, in the even of a new key value in the EVI field, a new EVI symbol table entry must be created. By adding the new entry to the end of the existing EVI symbol table, the integrity of the sorted sequence of EVI symbol table entries may be affected. The EVI symbol table will then have to be rebuilt in order for all entries to be properly sorted. However, for databases that change frequently, rebuilding an EVI every time that a new EVI symbol table entry is needed can be costly and create delays in processing.

In the illustrated embodiment of the present invention, the processing of EVI symbol tables accounts for the presence of unsorted EVI symbol table entries at the end of an EVI symbol table. These unsorted entries are the result of updating an EVI symbol table without rebuilding it, when changes made to the underlying database include the addition of a new key value in an EVI field. As long as the software that processes an EVI symbol table account for the possibility of unsorted entries at the end of the sorted EVI symbol table entries, the integrity of an EVI symbol table can be maintained without excessive cost and processing delay. Although no unsorted EVI symbol table entries appear in FIG. 2, unsorted EVI symbol table entries appear in forthcoming examples of the methods of the present invention.

Referring back to FIG. 1, the methods of the present invention utilize EVI symbol table 127 of EVI 126 to significantly improve the performance of user queries, such as user query 129, that contain a criterion. The front-end processing by relational database system 123 determines if user query 129 has an SQL command with a criterion applicable to a database field. An EVI symbol table provides all the necessary information to generate statistics for the SQL command with the criterion, if the EVI symbol table has EVI field(s) that match the database field(s) specified by the criterion. Detailed examples of user query 129 that are supported by the methods of the present invention follow.

Figure 3:
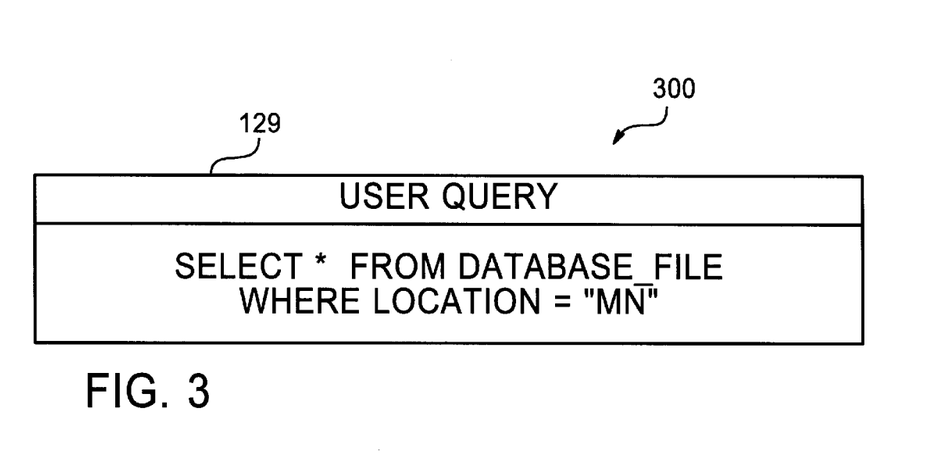
FIG. 3 is an example of an SQL command with a criterion.

Referring now to FIG. 3, an example of an SQL command with a criterion is illustrated. User query 129 in FIG. 3 requests a list of the records that have a value of "MN" in the LOCATION field, from the database named DATABASE_FILE. Given that there is an EVI built on the LOCATION field of the DATABASE_FILE, the methods of the present invention can be employed by the relational database system. It should be noted that only the symbol table portion of the EVI is employed to obtain statistics for queries; therefore, the EVI vector table is not shown or discussed any further in this or the forthcoming examples.

The statistics used by a database optimizer generally include an indication of the number of records that are expected to meet a criterion in a SQL command of a query. Determining the number of records that meet a criterion is extremely simple using EVI symbol table 127, because each EVI symbol table entry represents one of the unique LOCATION values, and identifies a count of the number of records having that value.

Unfortunately, known methods for generating such statistics are not particularly fast or accurate. One known method involves building a static repository of statistic information about the database, which is generated by a utility that, when invoked by the user, evaluates the data to build statistics. Unfortunately, the resulting statistics may become inaccurate because the reflect the status of the database at the time the utility is run, and do not reflect changes that may have occurred since the utility was run. Where the database contains substantial "live" data that is in a constant state of change, the static statistics can become highly inaccurate, leading to less than optimal operation of the relational database. A possible alternative method for generating statistics, would be to scan existing bit-vector indexes to generate statistics for a command. This alternative method would have the advantage of utilizing an accurate index to the data, and thus generate an accurate statistic. However, scanning the index would be time consuming; indeed, the time required would be comparable to the time required to execute the command.

In accordance with principles of the present invention, statistics for a command specifying a criterion, are obtained by scanning through EVI symbol table 127 and accumulating the key value counts from each EVI symbol table entry having a key value that matches the criterion. Since the EVI is dynamically maintained to accurately reflect the underlying data, the statistics generated in this manner will always be accurate. Accordingly, the methods of the present invention generate statistics significantly faster and/or more accurately than when traditional database indexes, or other methods for generating statistics are employed. Indeed, given that an EVI exists for the EVI field specified in a criterion of the user query, accurate statistics can be returned almost instantaneously compared to other methods.

Figure 4:
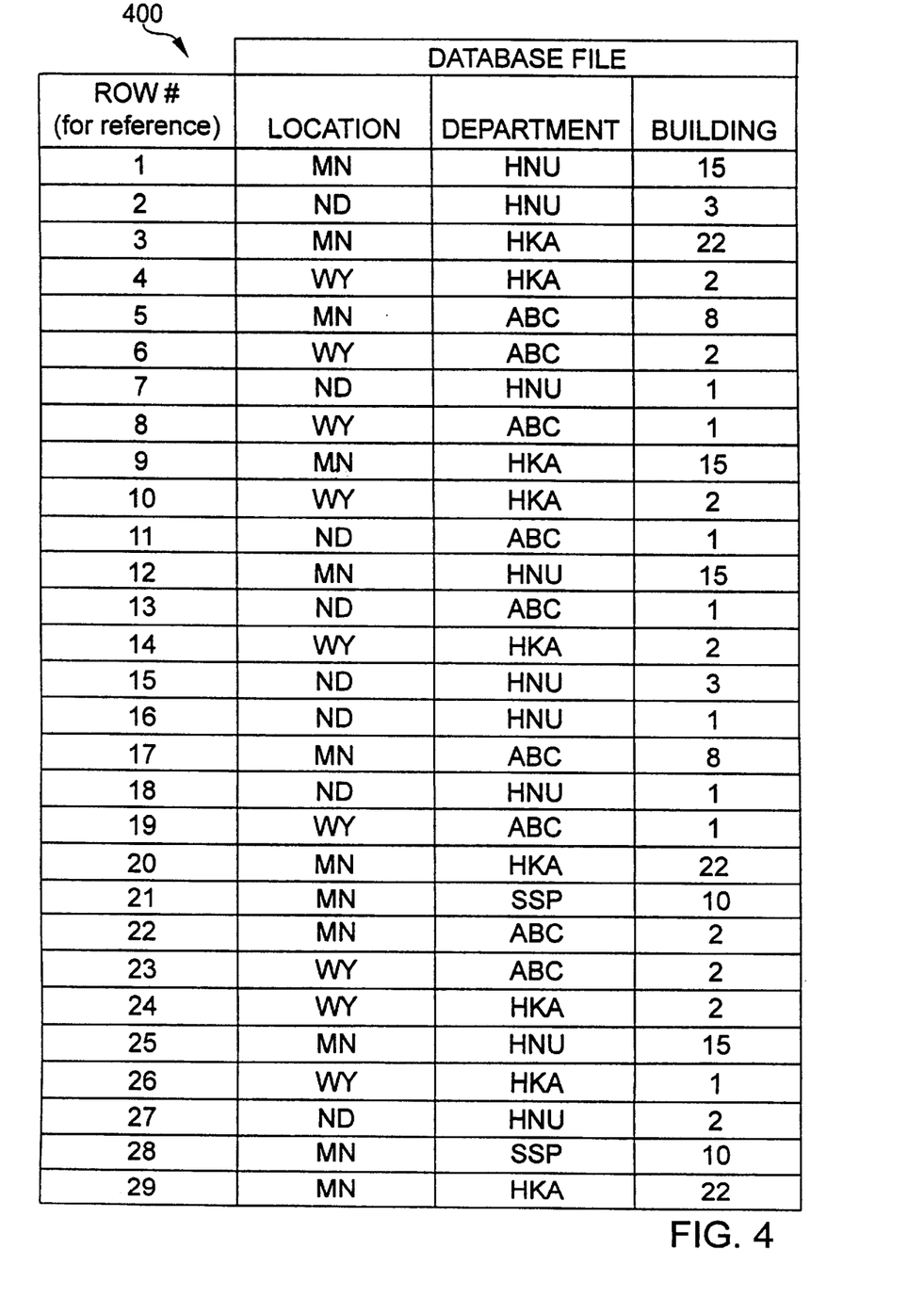
FIG. 4 is an example of selected fields from a relational database.
Figure 5:
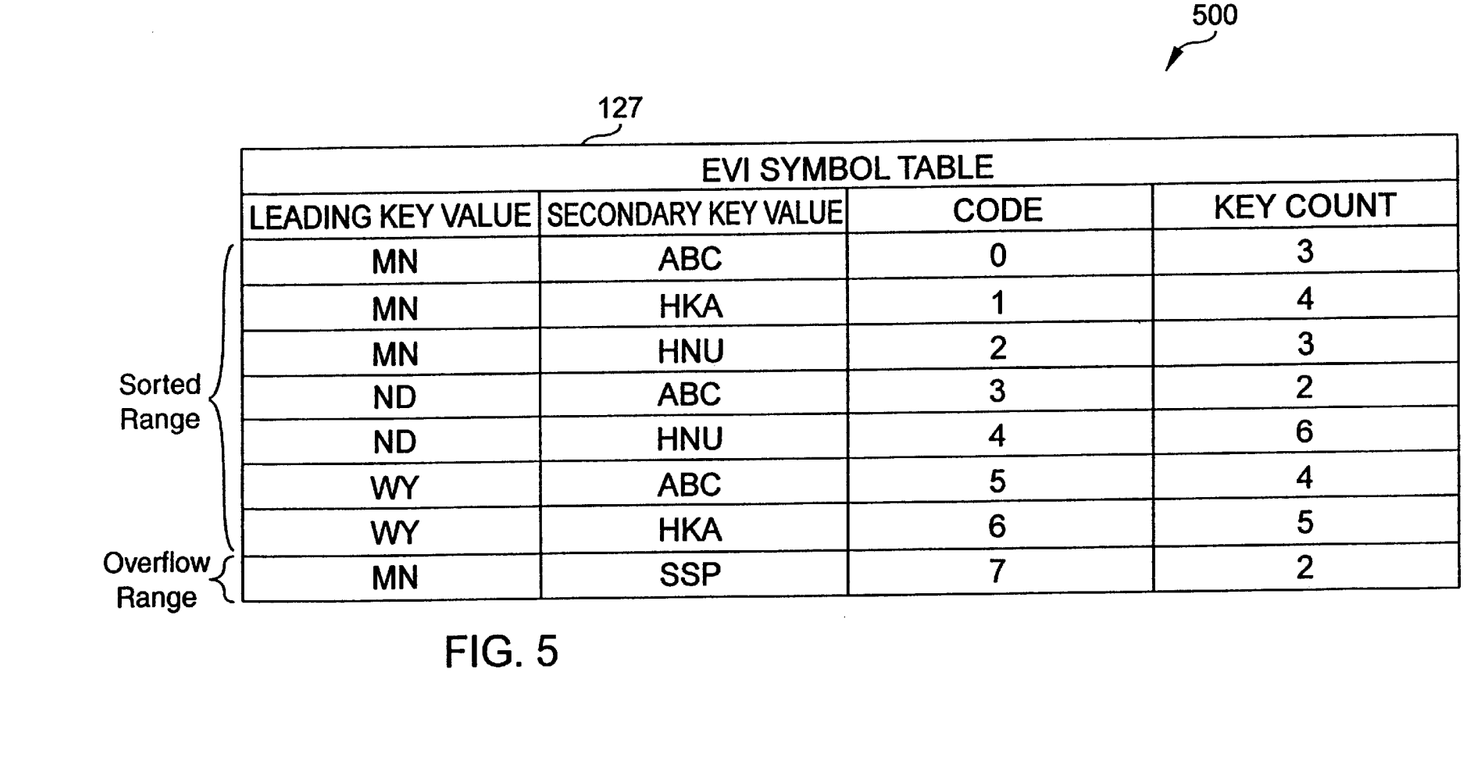
FIG. 5 is an example of a multiple key encoded vector index symbol table.

An encoded vector index (EVI) can be built over one database field as is the EVI represented by EVI symbol table 127 in FIG. 2, or an EVI can be built over more than one database field. Referring now to FIGS. 4 and 5, an example of selected fields from a relational database, and an example of a multiple key encoded vector index symbol table are illustrated respectively. EVI symbol table 127 of FIG. 5 is built over two of the database fields illustrated in FIG. 4: LOCATION, and DEPARTMENT. Although 29 rows exist in the DATABASE FILE relational database, EVI symbol table 127 built upon the LOCATION and DEPARTMENT fields contains only eight EVI symbol table rows. The reason is that only 8 unique value combinations of the LOCATION and DEPARTMENT fields exist in the 29 rows of DATABASE FILE.

When an EVI is built over more than one EVI field, the EVI is referred to as a multiple key EVI. In the symbol table of a multiple key EVI, such as EVI symbol table 127 in FIG. 5, the EVI fields are given specialized names to distinguish them from each other: a leading EVI field and one or more secondary key fields. In the case of EVI symbol table 127, the leading EVI field is the LOCATION field and the secondary key field is the DEPARTMENT field.

When EVI symbol table 127 is built, the EVI symbol table entries are sorted first by the leading key field, and second by the one or more secondary key fields. However, any changes made to DATABASE FILE after EVI symbol table 127 is built possibly add a new unique combination of values in the LOCATION and DEPARTMENT fields. In the case of EVI symbol table 127, it can be seen that a new combination, LOCATION=MN and DEPARTMENT=SSP was added to DATABASE FILE after EVI symbol table 127 was built. This new entry could not be added to EVI symbol table 127 in proper sort sequence without rebuilding the table. Therefore, the new entry was added at the end of EVI symbol table 127. As a result, EVI symbol table 127 contains sorted entries followed by unsorted entries.

A multiple key EVI allows accurate statistics to be built for an individual criterion in a query. For instance, a multiple key EVI can be used for a simple user query like the one presented in FIG. 3. The only difference in processing a multiple key EVI is that a range of EVI symbol table entries is equivalent to one particular value in an EVI leading key field, instead of one EVI symbol table entry per particular value in an EVI field. As illustrated in FIG. 4, the first three rows and the last row of EVI symbol table 127 represent the range of EVI symbol table entries for the key value "MN." Similarly, the next two EVI symbol table entries represent the range for the key value "ND," and so on. Thus, by processing ranges of EVI symbol table entries, a simple user query can generate statistics using multiple key EVI's.

It should be noted that with regards to the example above, any unsorted EVI symbol table entries must also be taken into account by the relational database system. Thus, when processing a range of EVI symbol table entries that equates to a particular leading key value, the unsorted EVI symbol table entries with the same particular leading key value must also be processed. This was already stated in the example of processing the range of values for the leading key value= "MN." The 3 rows in the sorted EVI symbol table entries with the leading key value="MN," as well as the unsorted entry in with a leading key value of "MN" must all be considered to correctly process EVI symbol table 127. The presence of unsorted entries complicates processing; however, the extra processing step allows the methods of the present invention to support both database tables that are warehoused and do not change, as well as database tables that change frequently.

Figure 6:
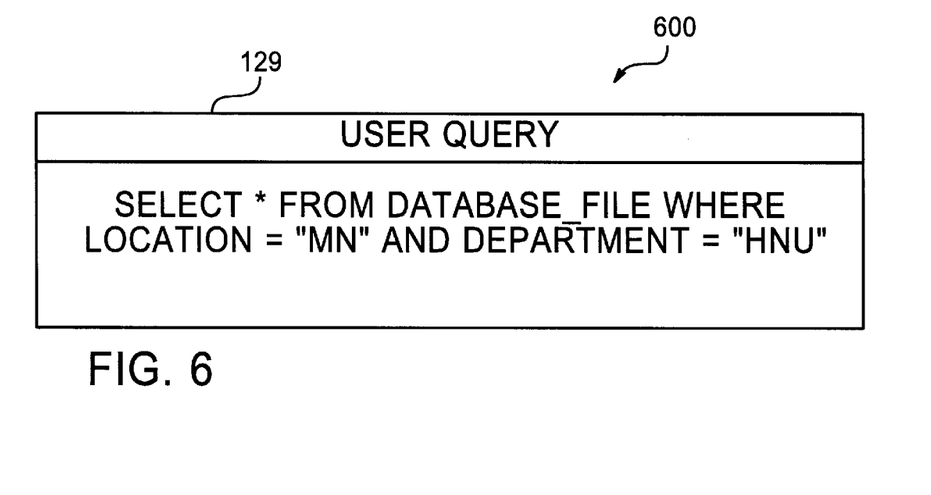
FIG. 6 is an example of an SQL command with multiple criteria.

Referring now to FIG. 6, an example of an SQL command with multiple criteria, is illustrated. User query 129 is requesting all records having a value in the LOCATION field of "MN" and a value in the DEPARTMENT field of "HNU". As a first step in generating statistics for this query, the database system identifies that this request can be processed using a multiple key EVI with an EVI symbol table such as EVI symbol table 127 in FIG. 5. Although EVI symbol table 127 is organized with a leading key field of LOCATION, and a secondary key field of DEPARTMENT, the hierarchy of EVI symbol table 127 does not matter to the methods of the present invention. As long as an EVI is indexed both on LOCATION and DEPARTMENT, statistics for multiple criteria applicable to both LOCATION and DEPARTMENT can be generated quickly and easily using the EVI symbol table.

Determining a count of the number of records having the desired combination of values for DEPARTMENT and LOCATION is as simple as merely sequentially scanning EVI symbol table 127 and returning the count from the symbol table entry having this unique combination of values. In a similar manner, a query including criteria on both the DEPARTMENT and LOCATION fields, but with a different logical relationship, can also be evaluated using an multiple key EVI. For example, statistics for a query requesting records that have a value of "HNU" for DEPARTMENT or a value of "MN" for LOCATION can be satisfied by sequentially scanning EVI symbol table 127 and accumulating the counts from all symbol table entries having "HNU" for DEPARTMENT or "MN" for LOCATION. Statistics for a query requesting records that have a value of "HNU" for DEPARTMENT but not have a value of "MN" for LOCATION can be satisfied by sequentially scanning EVI symbol table 127 and accumulating the counts from all symbol table entries having "HNU" for DEPARTMENT but not having a value of "MN" for LOCATION. Statistics for a query requesting records that do not have either a value of "HNU" for DEPARTMENT or a value of "MN" for LOCA-TION can be satisfied by sequentially scanning EVI symbol table 127 and accumulating the counts from all symbol table entries not having either respective value.

Figure 7:
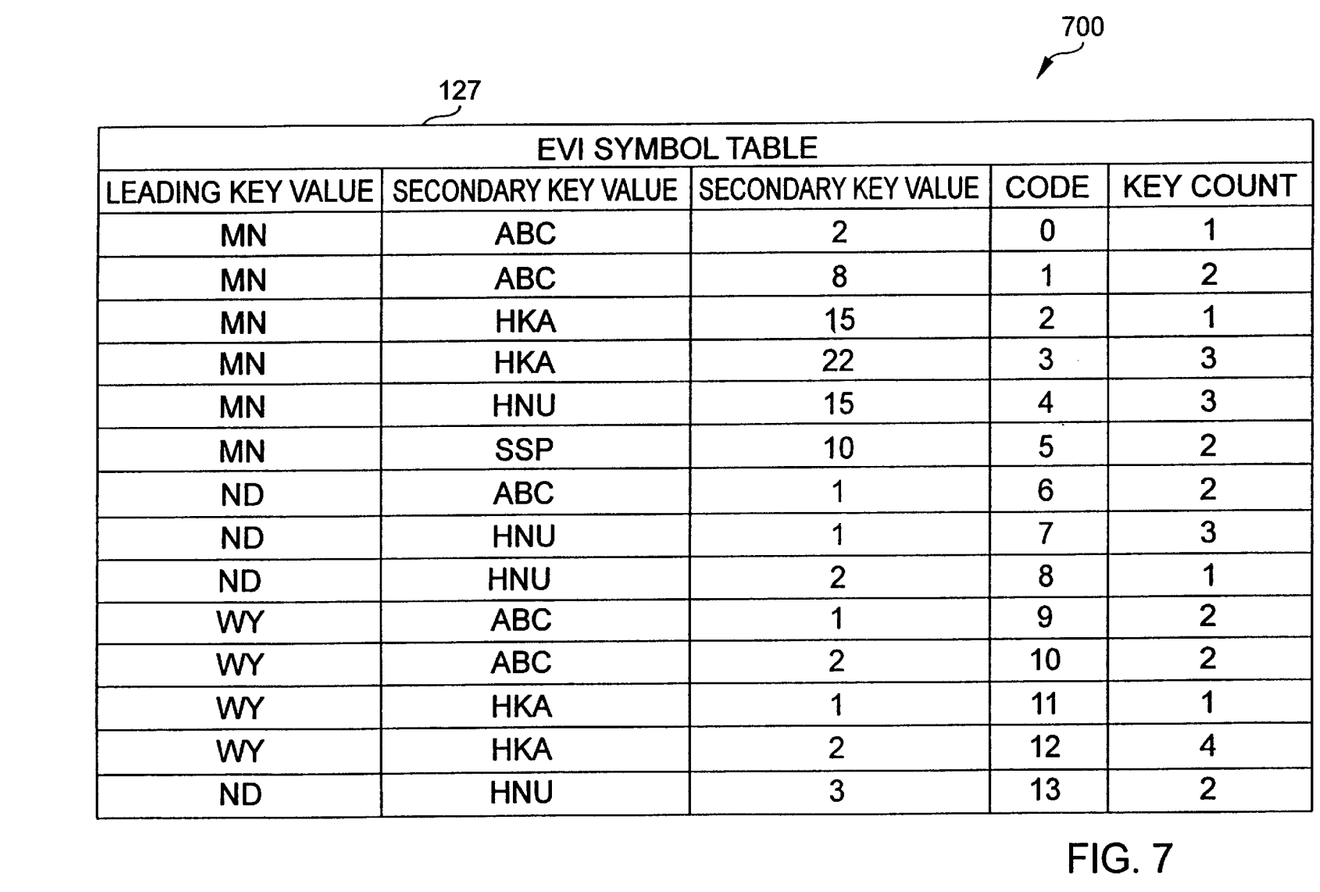
FIG. 7 is an example of a multiple key encoded vector index symbol table.

Multiple key EVI's can be built using more than two database fields. Referring now to FIG. 7, an example of a multiple key encoded vector index symbol table with 3 EVI fields is illustrated. EVI symbol table 127 was built from the LOCATION, DEPARTMENT, and BUILDING fields of the DATABASE FILE, the relevant portion of which is shown in FIG. 4. Fourteen rows exist in EVI symbol table 127 because within the 29 rows of DATABASE FILE, there are 14 unique combinations of the values in the LOCATION, DEPARTMENT, and BUILDING fields.

Statistics for a user query such as that shown in FIG. 6, which has criterion relating to LOCATION and DEPARTMENT, can be generated from the multiple key EVI shown in FIG. 7 which was built from these fields and from the BUILDING field. Because the EVI shown in FIG. 7 was built from the LOCATION and DEPARTMENT fields, the relational database system identifies that this request can be processed using the multiple key EVI and EVI symbol table in FIG. 7. To generate statistics for the query shown in FIG. 6, the ranges of the EVI symbol table entries of FIG. 7 will be grouped together to identify counts for combinations of LOCATION and DEPARTMENT values that meet the criteria of the query. Generating statistics for the query is then as simple as merely scanning EVI symbol table 127, accumulating counts for entries that meet the criteria of the query.

Accurate statistics for user query 129 can thus be generated without any need to process other database indices, or use other methods. Again it should be noted that the relational database system will process the EVI symbol table EVI symbol table entries sequentially, first processing the sorted EVI symbol table entries, and then processing any unsorted entries that may exist at the end of the sorted entries.

Figure 8:
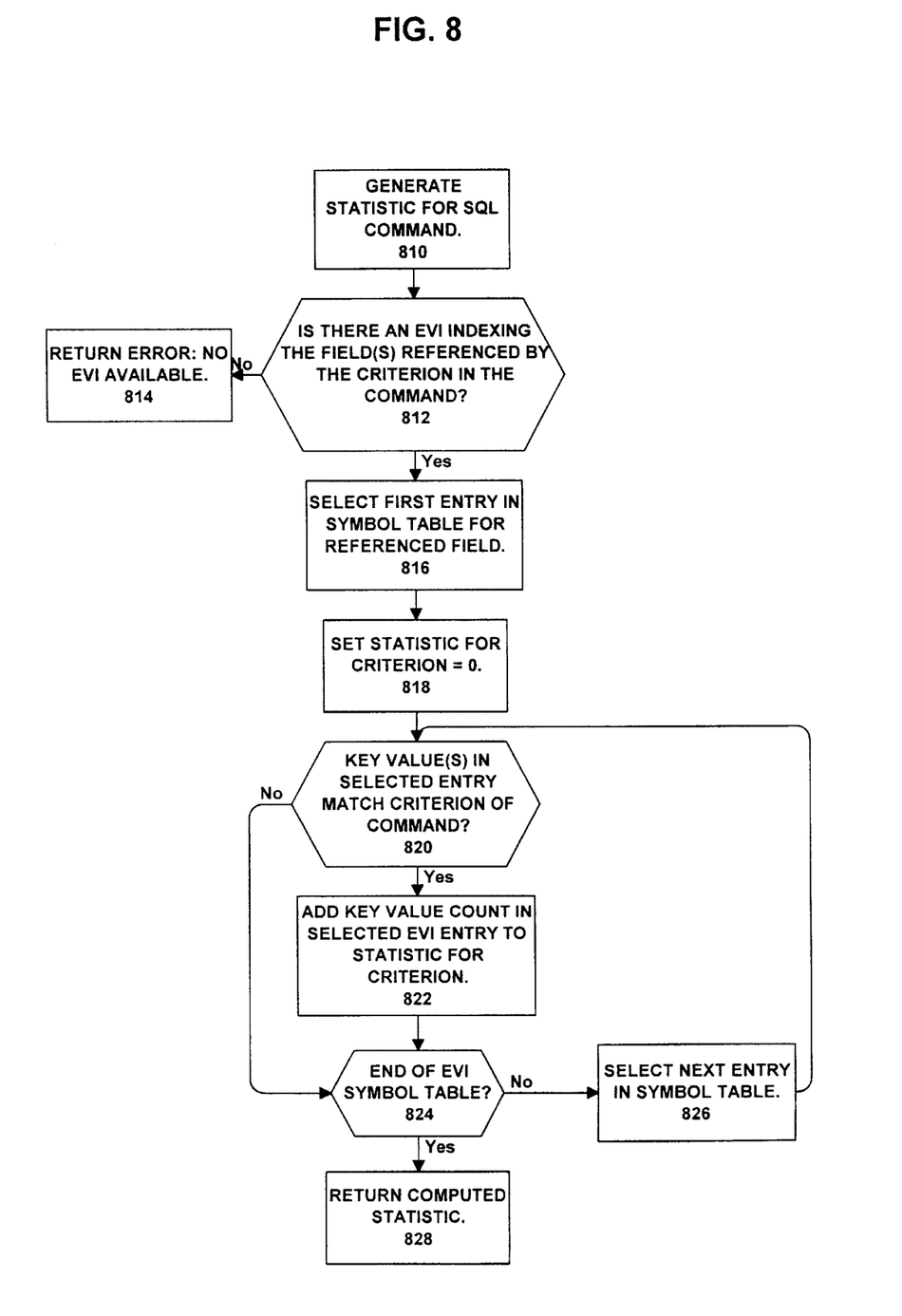
FIG. 8 is a flow chart of the process for generating a statistic for an SQL command having a criterion.

Referring now to FIG. 8, the process 810 for scanning an EVI symbol table to generate a statistic for an SQL command can be elaborated. In a first step 812, the relational database system evaluates the stored EVI's to determine whether there is an EVI indexing the fields referenced by the criterion in the command for which a statistic is to be generated. If not, in step 814 an error is returned indicating that there is no EVI available to generate the statistic. The statistic will then be generated by other methods known in the prior art, if possible. If, however, in step 812 an EVI is located indexing the one or more fields referenced in the criterion, then processing continues to step 816, in which the first entry in the EVI symbol table is selected, and step 818, in which a statistic value for the criterion is initialized with a value of zero.

The process then enters a loop beginning with step 820. In each pass through this loop, in step 820 the current entry of the EVI is evaluated to determine whether the key values in the entry match the criterion of the SQL command for which a statistic is to be generated. As noted above, the criterion in the SQL command may specify a value or value range for a given field, or may specify a combination of values for multiple fields, using any logical operator. If in step 820, the key value(s) in the current EVI entry match the criterion, then in step 822 the key value count in the current EVI entry is added to the current statistic value for the criterion. After step 822, or immediately after step 820 if the key values of the selected value do not match the criterion, in step 824 it is determined whether the end of the EVI symbol table has been reached. If not, then in step 826 the next entry in the EVI symbol table is selected, and processing returns to step 820 to evaluate this entry. If the end of the EVI symbol table has been reached, then in step 828 the computed statistic is returned as the statistic for the SQL command.

As an example of the use of statistics for query optimization, consider a SELECT SQL command having multiple criteria, such as that shown in FIG. 6 and described above. Based upon the statistics generated for each criterion, the results for the SELECT command may be generated by either (a.) selecting a set of records in which the first field does or does not match the first criterion, and then selecting from or adding to this set of records, records in which the second field does or does not match the second criterion, or (b.) selecting a set of records in which the second field does or does not match the second criterion, and then selecting from or adding to this set of records, records in which the first field does or does not match the first criterion. The approach taken may be chosen based on the relative count of records matching the first criterion compared to the count of records matching the second criterion, the logical operators applied to the criteria and the logical relationship between the criteria in the SELECT SQL function. In essence, the approach will be selected so as to minimize the number of records to be processed in each step of responding to the SQL query.

The relational database system of the illustrated embodiment provides efficient generation of statistics by sequentially scanning through the entries of an EVI symbol table. Statistics are returned without the need to invoke alternate database indexes, and without the need to use other statistic generating methods. Since the EVI symbol table has a list of unique values for the EVI fields upon which it is indexed, the relational database system can process the information in the fields of this table much more rapidly than through the use of other database indexes. Thus, the methods of the present invention provide the relational database system with the programming to process the EVI symbol table to generate statistics. While the invention has been particularly shown and described with reference to embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   an encoded vector index (EVI) built on at least one database field in a database, the EVI comprising a plurality of EVI symbol table entries, each EVI symbol table entry comprising a key value for each of the at least one database fields and a count of records including said key value; and
   a relational database system, the relational database system processing a plurality of EVI symbol table entries to generate a statistic for a user query, the user query having a SQL command specifying a criterion on at least one database field on which the EVI is built, the relational database system determining, from among two candidate approaches, an approach to use in processing said SQL command based on said statistic.

2. The apparatus of claim 1 wherein the relational database system sequentially processes the plurality of EVI symbol table entries to generate a statistic for the user query.

3. The apparatus of claim 1 wherein the relational database system generates a statistic for the user query by returning a count of a number of records matching the criterion from each of the at least one database fields.

4. The apparatus of claim 1 wherein the relational database system generates statistics for a SQL command that specifies a plurality of criteria on database fields indexed by the EVI, the relational database generating statistics by sequentially processing the plurality of EVI symbol table entries, and returning a plurality of counts of records meeting the plurality of criteria specified in the SQL command.

5. The apparatus of claim 4 wherein the relational database system performs a SELECT SQL function that identifies first and second criteria for record selection applicable to first and second database fields, by either (a.) selecting a set of records in which the first field does or does not match the first criterion, and then selecting from or adding to this set of records, records in which the second field does or does not match the second criterion, or (b.) selecting a set of records in which the second field does or does not match the second criterion, and then selecting from or adding to this set of records, records in which the first field does or does not match the first criterion, based upon a comparison of a count of records matching the first criterion and a count of records matching the second criterion, the logical operators applied to the criteria and the logical relationship between the criteria in the SELECT SQL function.

6. A method of processing an SQL command comprising the steps of:
   sequentially processing through a plurality of encoded vector index (EVI) symbol table entries in an EVI, the EVI indexed on a database field specified in a criterion of the SQL command; and
   generating a statistic for the SQL command by returning a count of records meeting said criterion, and
   determining, from among two candidate approaches, an approach to use in processing said SQL command based on said statistic.

7. The method of claim 6 wherein the step of sequentially processing through a plurality of EVI symbol table entries comprises sequentially processing through a plurality of EVI symbol table entries in an EVI that is indexed on a plurality of database fields, one database field of which is specified in a SQL command.

8. The method of claim 6 wherein:
   the step of sequentially processing through a plurality of EVI symbol table entries comprises sequentially processing through a plurality of EVI symbol table entries in an EVI that is indexed on a plurality of database fields which are specified in criteria of a SQL command; and
   the step of generating a statistic for the SQL DISTINCT command comprises returning a count of records with fields meeting said criteria.

9. The method of claim 8 wherein a SELECT SQL function that identifies first and second criteria for record selection applicable to first and second database fields, is performed by either (a.) selecting a set of records in which the first field does or does not match the first criterion, and then selecting from or adding to this set of records, records in which the second field does or does not match the second criterion, or (b.) selecting a set of records in which the second field does or does not match the second criterion, and then selecting from or adding to this set of records, records in which the first field does or does not match the first criterion, based upon a comparison of a count of records matching the first criterion and a count of records matching the second criterion, the logical operators applied to the criteria and the logical relationship between the criteria in the SELECT SQL function.

10. A program product comprising:

an encoded vector index (EVI) built on at least one database field in a database, the EVI comprising a plurality of EVI symbol table entries, each EVI symbol table entry comprising a key value for each of the at least one database field;

a relational database system, the relational database system processing a plurality of EVI symbol table entries to generate a statistic for a user query, the user query having a SQL command specifying criterion on at least one database field on which the EVI is built, and determining, from among two candidate approaches, an approach to use in processing said SQL command based on said statistic; and signal bearing media bearing the EVI and the relational database system.

11. The program product of claim 10 wherein the signal bearing media comprises transmission media.

12. The program product of claim 10 wherein the signal bearing media comprises recordable media.

13. The program product of claim 10 wherein the relational database system sequentially processes the plurality of EVI symbol table entries to generate a statistic for the user query.

14. The program product of claim 10 wherein the relational database system generates a statistic for the user query by returning a count of records from each of the at least one database field matching the criterion.

15. The program product of claim 10 wherein the relational database system performs a SELECT SQL function that identifies first and second criteria for record selection applicable to first and second database fields, by either (a.) selecting a set of records in which the first field does or does not match the first criterion, and then selecting from or adding to this set of records, records in which the second field does or does not match the second criterion, or (b.) selecting a set of records in which the second field does or does not match the second criterion, and then selecting from or adding to this set of records, records in which the first field does or does not match the first criterion, based upon a comparison of a count of records matching the first criterion and a count of records matching the second criterion, the logical operators applied to the criteria and the logical relationship between the criteria in the SELECT SQL function.

* * * * *

UNITED STATES PATENT AND TRADEMARK OFFICE
CERTIFICATE OF CORRECTION

PATENT NO. : 6,405,187 B1 Page 1 of 1
DATED : June 11, 2002
INVENTOR(S) : Randy Lynn Egan, Kevin James Kathmann, Gary Ross Ricard and Thuan Bui It is certified that error appears in the above-identified patent and that said Letters Patent is hereby corrected as shown below:

Title page,
Item [74], *Attorney, Agent, or Firm,* "Wood, Heron & Evans" should be -- Wood, Herron & Evans --.

Signed and Sealed this

Twentieth Day of August, 2002

Attest:

Attesting Officer

JAMES E. ROGAN
*Director of the United States Patent and Trademark Office*